(12) United States Patent
Zhu et al.

(10) Patent No.: US 9,905,006 B2
(45) Date of Patent: Feb. 27, 2018

(54) MEDICAL IMAGE PROCESSING APPARATUS, MEDICAL IMAGE PROCESSING METHOD, AND MEDICAL IMAGING SYSTEM

(71) Applicant: Toshiba Medical Systems Corporation, Otawara-shi (JP)

(72) Inventors: Qi Zhu, Beijing (CN); Qiqi Xu, Beijing (CN); Xiaojing Wang, Beijing (CN); Fanjie Meng, Beijing (CN)

(73) Assignee: Toshiba Medical Systems Corporation, Otawara-shi (JP)

( * ) Notice: Subject to any disclaimer, the term of this patent is extended or adjusted under 35 U.S.C. 154(b) by 93 days.

(21) Appl. No.: 15/014,130

(22) Filed: Feb. 3, 2016

(65) Prior Publication Data

US 2016/0239972 A1    Aug. 18, 2016

(30) Foreign Application Priority Data

Feb. 12, 2015  (CN) .......................... 2015 1 0075956
Nov. 16, 2015  (JP) ................................. 2015-224265

(51) Int. Cl.
*G06T 7/00* (2017.01)
*G06T 7/33* (2017.01)

(52) U.S. Cl.
CPC ............ *G06T 7/0014* (2013.01); *G06T 7/337* (2017.01); *G06T 2207/20104* (2013.01); *G06T 2207/30016* (2013.01)

(58) Field of Classification Search
CPC ... G06T 3/0068; G06T 3/0075; G06T 3/0093; G06T 5/006; G06T 7/0014; G06T 7/30; G06T 7/337; A61B 6/5217
See application file for complete search history.

(56) References Cited

U.S. PATENT DOCUMENTS

| | | | |
|---|---|---|---|
| 8,559,686 B2 | 10/2013 | Azemoto et al. | 382/128 |
| 2014/0301623 A1* | 10/2014 | Wang | G06T 7/0012 382/131 |
| 2016/0171698 A1* | 6/2016 | Razeto et al. | G06T 7/0024 345/441 |
| 2016/0217576 A1* | 7/2016 | Kabus et al. | G06T 7/0024 |
| 2016/0292864 A1* | 10/2016 | Dabbah et al. | G06T 7/0034 |

FOREIGN PATENT DOCUMENTS

JP   2007-209583 A   8/2007
JP   2011-67253 A    4/2011

* cited by examiner

*Primary Examiner* — Andrew W Johns
(74) *Attorney, Agent, or Firm* — Oblon, McClelland, Maier & Neustadt, L.L.P.

(57) ABSTRACT

A medical image processing apparatus according to an embodiment includes processing circuitry. The processing circuitry implements registration on a medical image and each of a plurality of reference images. The processing circuitry performs deformation on the medical image based on a result of the registration. The processing circuitry sets a first region of interest on the deformed medical image. The processing circuitry sets on at least two of the plurality of reference images, a second region of interest corresponding to the first region of interest. The processing circuitry retrieves from the reference images on which the second region of interest is set, a reference image similar to an image in the first region of interest.

15 Claims, 6 Drawing Sheets

MEDICAL IMAGE PROCESSING APPARATUS, MEDICAL IMAGE PROCESSING METHOD, AND MEDICAL IMAGING SYSTEM

CROSS-REFERENCE TO RELATED APPLICATIONS

This application is based upon and claims the benefit of priority from Chinese Patent Application No. 201510075956.2, filed on Feb. 12, 2015; and Japanese Patent Application No. 2015-224265, filed on Nov. 16, 2015, the entire contents of all of which are incorporated herein by reference.

FIELD

The present invention generally relates to the field of medical image processing, and more particularly, to a medical image processing apparatus, a medical image processing method and a medical imaging system.

BACKGROUND

In differential diagnosis based on medical images, the accuracy of the diagnosis on the current medical image is increased by reference to historical images to which a diagnosis result is given. Generally, a historical medical image to be referred to is retrieved from a historical medical image library according to text labels of historical images or by comparing overall image characteristics of the current medical image and historical medical images.

BRIEF DESCRIPTION OF THE DRAWINGS

The present invention will be better understood with reference to the following description taken in conjunction with drawings in which same or like reference signs denote same or like components. The drawings, together with the detailed description below, are incorporated into and form a part of the specification and serve to illustrate, by way of example, preferred embodiments of the present invention and to explain the principle and advantages of the present invention. In the drawings.

DETAILED DESCRIPTION

Figure 1:
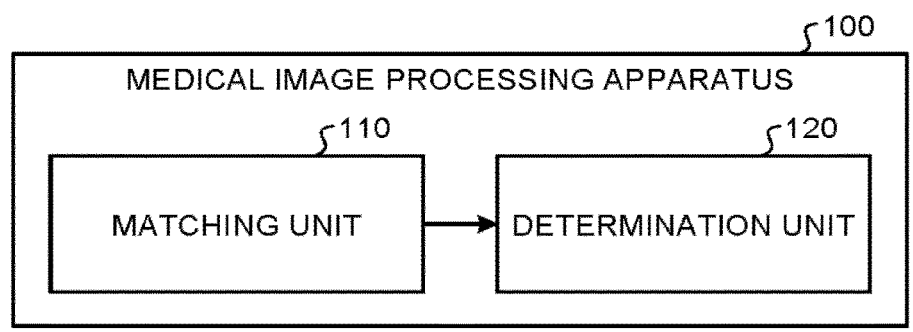
FIG. 1 is a block diagram showing an exemplary configuration of an image processing apparatus according to an embodiment of the present invention.

The following presents a brief summary of the present invention to provide a basic understanding of some aspects of the present invention. It should be appreciated that the brief summary, which is not the exhaustive overview of the present invention, is not intended to identify the key or critical parts of the present invention or limit the scope of the present invention, but merely to present some concepts in a simplified form as a prelude to the more detailed description that is discussed later.

A medical image processing apparatus according to an embodiment includes processing circuitry. The processing circuitry implements registration on a medical image and each of a plurality of reference images. The processing circuitry performs deformation on the medical image based on a result of the registration. The processing circuitry sets a first region of interest on the deformed medical image. The processing circuitry sets on at least two of the plurality of reference images, a second region of interest corresponding to the first region of interest. The processing circuitry retrieves from the reference images on which the second region of interest is set, a reference image similar to an image in the first region of interest.

In accordance with another aspect of the present invention, a medical image processing method is provided, which includes a step of determining a matching result of a target image with at least one reference image in a reference image set, wherein the matching result is determined by matching a region of interest of the target image with a corresponding sub-region of the reference image. The method further includes a step of determining one or more reference images having high similarity with the target image based on the matching result.

In accordance with yet another aspect of the present invention, a medical imaging system is provided, which includes the above medical image processing apparatus.

In accordance with still another aspect of the present invention, a program product is provided, in which machine-readable instruction codes are stored. The above described medical image processing method can be implemented by a computer when the instruction codes are read and executed by the computer.

In accordance with yet still another aspect of the present invention, a storage medium is provided, on which the above program product in which machine-readable instruction codes are stored is carried.

According to embodiments of the present invention, a reference image is determined aiming at a specific region of interest, which is beneficial to determine a reference image for differential diagnosis more accurately and more effectively.

Embodiments of the present invention are described below with reference to accompanying drawings. The elements and features described in a drawing or embodiment of the present invention can be combined with those shown in one or more other drawings or embodiments. It should be noted that for the sake of clarity, representation and description of the components and processing that are unrelated to the present invention but well known to those of ordinary skill in the art are omitted in the drawings and description.

As shown in FIG. 1, a medical image processing apparatus 100 according to an embodiment of the present invention includes a matching unit 110 and a determination unit 120.

The matching unit 110 is configured to determine a matching result of a target image with at least one reference image in a reference image set, wherein the matching unit 110 determines the matching result by matching a region of interest of the target image with a corresponding sub-region of the reference image.

The region of interest may include one or more sub-regions at one or more predetermined positions in the image, the sub-regions may have predetermined shapes. The region of interest may be defined by a user or may be designated based on a predetermined position template, as stated hereinafter.

The determination unit 120 is configured to determine one or more reference images having relatively high similarity with the target image based on the matching result of the matching unit 110. For example, a predetermined number of reference images most similar to the target image may be provided, or reference images of which the similarity with the target image is higher than a present threshold may be provided.

The reference image may be a historical medical image for which the type, for example, the disease type, has been marked, and the reference image determined by the determination unit 120 can be provided to the user such as a doctor to be used for differential diagnosis, for example. Then, the user such as a doctor can give a diagnosis merely by reference to the determined reference image, without browsing a great number of historical images, thus the operational efficiency can be improved. The reference image is, for example, an atlas image.

Some diseases have a typical distribution in a specific anatomic region. For example, nearly 75% of cerebellopontine angle tumors are acoustic neuromas. For another example, chordoma most commonly appears at two positions: the cranial clivus and the sacrum at the bottom of a spine. Compared with existing methods of determining a reference image similar to a target image through the overall comparison of a target image and a reference image, the method of determining a similar reference image through an image matching based on a predetermined region of interest disclosed herein is capable of determining, more accurately and more effectively, a reference image from which helpful reference information is more likely to be provided.

It should be noted that the accuracy mentioned here is not the accuracy of differential diagnosis. The final diagnosis is given by the user (e.g., a doctor) of the medical image processing apparatus, but not by the medical image processing apparatus. The accuracy mentioned here refers to the accuracy of the determination of a corresponding reference image according to a target image, and more specifically, if the accuracy is higher, then the determined reference image has a higher similarity (including the similarity in the aspect of position distribution) with the target image so as to provide the user (e.g. a doctor) with a better reference for differential diagnosis.

Figure 2:
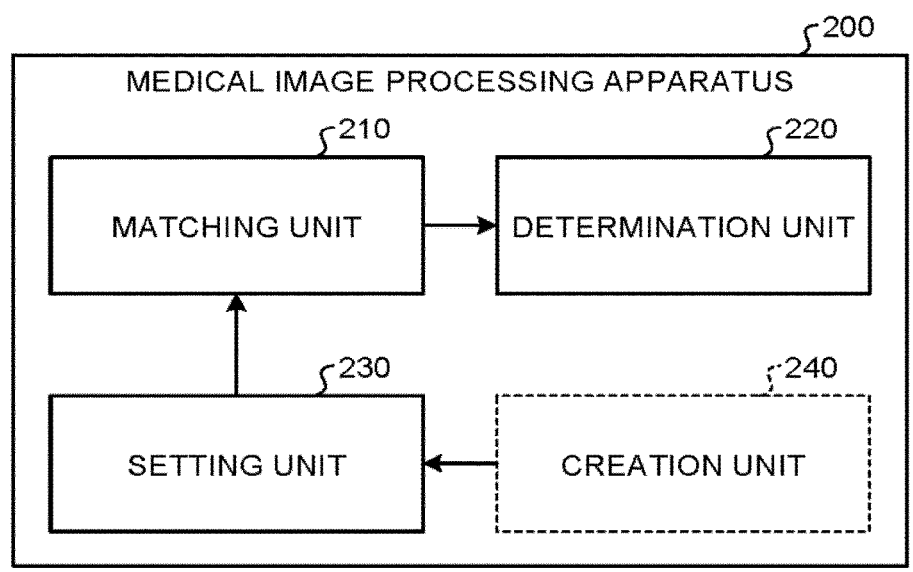
FIG. 2 is a block diagram showing an exemplary configuration of an image processing apparatus according to another embodiment of the present invention.

Next, the configuration of a medical image processing apparatus 200 according to an embodiment of the present invention is described with reference to FIG. 2. The medical image processing apparatus 200 includes a matching unit 210, a determination unit 220 and a setting unit 230. The matching unit 210 and the determination unit 220 are similar in configuration to the above mentioned matching unit 110 and determination unit 120, respectively. The setting unit 230 is configured to set at least one region of interest in a target image.

The setting unit 230 may set a region of interest according to a user instruction. For example, one or more regions (e.g. a region having a specific feature and a symmetric region thereof) may be manually selected by the user according to the image characteristics included in the target image as the region of interest. The setting unit 230 may provide information of the set region of interest to the matching unit 210 for matching.

Alternatively, the setting unit 230 may set a region of interest according to a predetermined position template. The position template may be stored in advance. For example, a previously used position template may be stored in a template library for the user to select. Besides, according to an embodiment, the image processing apparatus 200 may further include a creation unit 240 configured to create a new position template according to the input of the user. In other words, the setting unit 230 sets at least one of the plurality of regions of interest in accordance with a position template in which each of the plurality of regions of interest is arranged in a predetermined positional relationship.

Figure 3A:
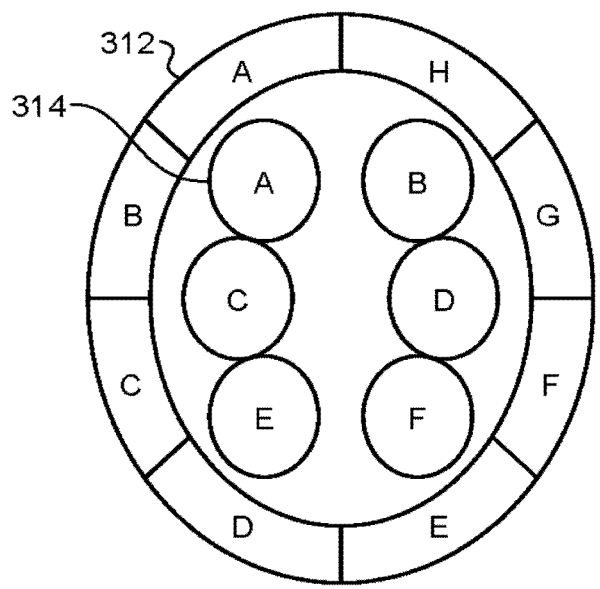
FIG. 3A and FIG. 3B show examples of predetermined template for setting a region of interest.
Figure 3B:
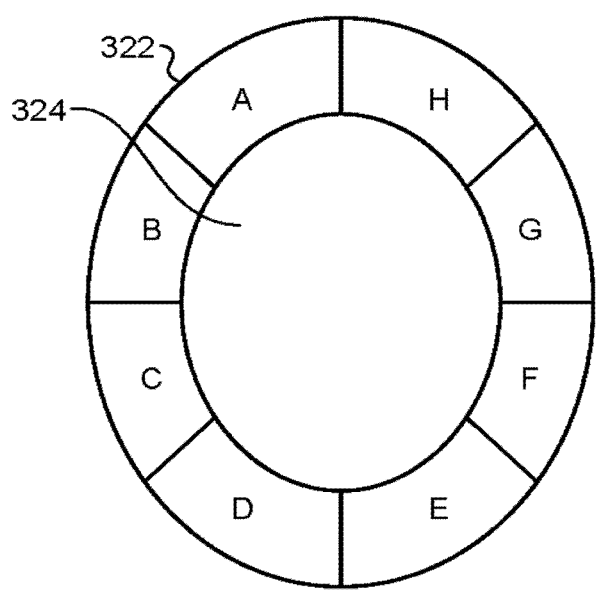

FIG. 3A and FIG. 3B schematically show two examples of a position template targeting at the image of the cross section of a brain.

In the exemplary template shown in FIG. 3A, 312A-312H indicate six regions of interest at the edge of the brain, and 314A-314F indicate six regions of interest at the central region of the brain.

In the exemplary template shown in FIG. 3B, 322A-322H indicate six regions of interest at the edge of the brain, and 324 indicates a region of interest at the central region of the brain.

For a specific disease, one or more regions can be selected from the above mentioned templates as one or more regions of interest. For example, it may be needed to determine whether multiple white matter injuries are caused by multiple sclerosis or vascular diseases, both of which occur at certainly regular positions in a brain. For example, multiple sclerosis usually occurs at a periventricular position, an infratentorial position and the position of spinal cord, while vascular diseases are usually not found at these positions. On the other hand, vascular diseases usually occur at basal nuclei position, while multiple sclerosis is usually not found here.

As an example of differential diagnosis on white matter injuries, the medical image processing apparatus according to embodiments of the present invention can designate a region of interest based on the occurrence position of white matter injuries in a target image and determine, aiming at the region of interest, a reference image relatively similar to the target image from a reference image library.

For example, if there is a lesion in a region of the target image corresponding to the region 314D shown in FIG. 3A, then the region 314D can be selected as a region of interest, and additionally, the region 314C symmetrical to the region 314D may also be selected as a region of interest. The determination unit can determine a reference image to be provided to the user as a reference image based on the matching of the regions 314C and 314D of interest with corresponding sub-regions of a reference image in the reference image library.

In another exemplary application, it is needed to determine through differential diagnosis whether or not a skull base tumor pertains to chordoma or chondrosarcoma. Generally, the lesion part of chordoma is at a central region while that of chondrosarcoma is off the central region. Accordingly, the exemplary application may employ, for example, the exemplary position template shown in FIG. 3B. More specifically, according to the distribution of lesion parts in the target image, a similar reference image may be determined by taking, for example, the region 324 shown in FIG. 3B as a region of interest.

In the existing methods for determining a reference image through overall image matching, it may occur that the multiple white matter injuries in a target image are caused by multiple sclerosis, but the reference image relatively similar to the target image resulting from overall image matching is a medical image corresponding to vascular diseases. In this case, the accuracy of the differential diagnosis carried out by the user may be reduced, or the user may require to provide more reference images, which may lead to an additional processing load.

The matching of a target image with a reference image based on a specific region of interest is beneficial to providing the user (e.g. doctor) with a reference image more close to lesion occurrence position of the target image and is therefore more accurate and effective in determining a reference image for differential diagnosis.

Although an exemplary embodiment of the determination of a similar reference image based on a position template is described above by a specific exemplary application, the present invention is not limited to the above specific example. For a specific application, the user can, for example, select a proper position template from the template library, wherein the template including for example, regions of interest set aiming at multiple occurrence positions of a specific disease. Alternatively, the user can self-define a position template using the creation unit 240, as described above with reference to FIG. 2.

Besides, the matching of the region of interest of the target image with the corresponding sub-region of the reference image can be carried out using the various image matching methods known in the art. According to an embodiment, image characteristics of a sub-region of the reference image may be stored in advance, and the region of interest of the target image is matched with a corresponding sub-region of the reference image based on the image characteristics stored.

Figure 4:
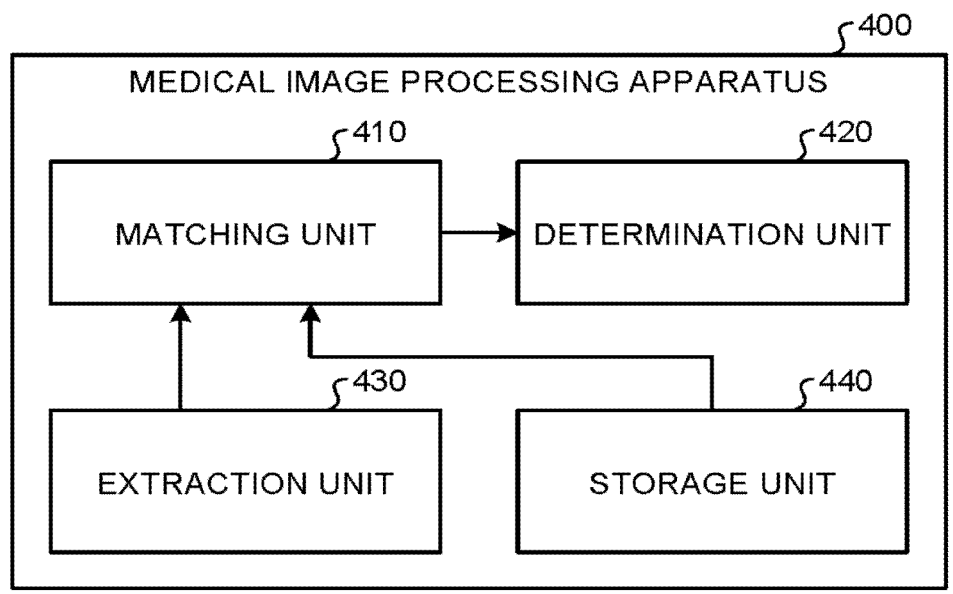
FIG. 4 is a block diagram showing an exemplary configuration of an image processing apparatus according to another embodiment of the present invention.

As shown in FIG. 4, a medical image processing apparatus 400 according to an embodiment of the present invention includes a matching unit 410, a determination unit 420, an extraction unit 430 and a storage unit 440, wherein the determination unit 420 is similar to the determination unit described above.

The extraction unit 430 is configured to extract image characteristics of the region of interest of the target image. In other words, the extraction unit 430 extracts first image characteristics which are characteristics of an image included in a first region of interest set on the medical image.

The storage unit 440 is configured to store the image characteristics of a sub-region of the reference image in the reference image set which is corresponding to the region of interest in the target image. In other words, the storage unit 440 stores second image characteristics which are characteristics of an image included in a second region of interest set on the reference image.

The matching unit 410 is configured to match the target image with the reference image based on the similarity of the image characteristics of the region of interest of the target image extracted by the extraction unit 430 and the image characteristics of the corresponding sub-region of the reference image stored in the storage unit 440.

Specifically, the region of interest of the target image may be determined based on a predetermined template. For example, the image characteristics extracted from a corresponding sub-region of a reference image according to a plurality of predetermined templates may be stored in the storage unit 440.

For example, the image characteristics may be characterized by vectors based on Hu invariant moment, edge histogram and the like. Accordingly, image characteristic vectors of each sub-region of each reference image may be stored in the storage device 440. The extraction unit 430 may extract, based on a position template, the image characteristics of the region of interest in the target image which are represented by vectors, for example. The matching unit 410 may match the target image with the reference image by determining the distance between the vector of the image characteristics of the region of interest of the target image and that of the image characteristics of the corresponding sub-region in the reference image. For example, it can be determined that there is a sub-region in the reference image which is matched with the region of interest when the distance is below a predetermined threshold.

Figure 5:
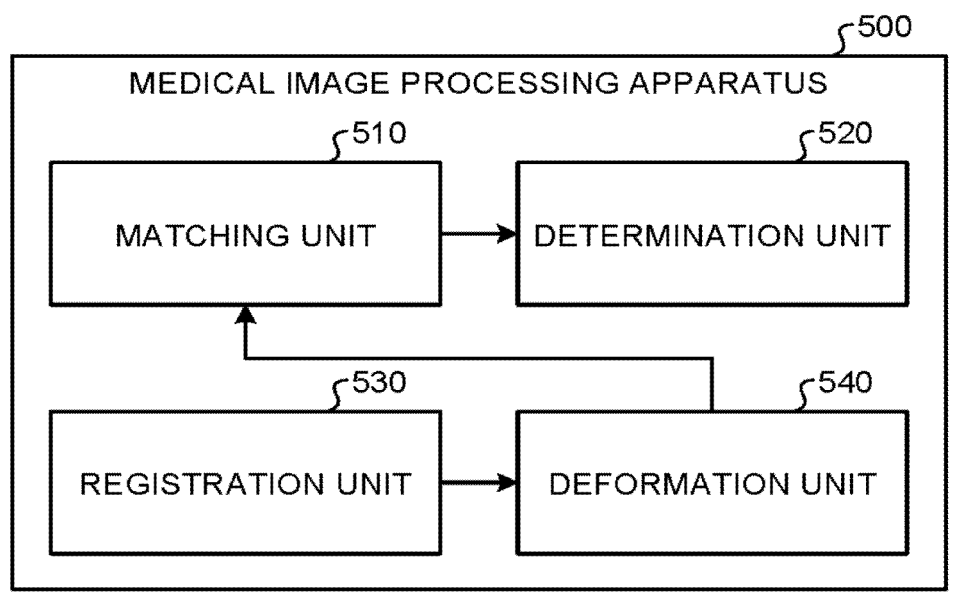
FIG. 5 is a block diagram showing an exemplary configuration of an image processing apparatus according to still another embodiment of the present invention.

Further, because of the difference in aspects such as imaging objects and imaging parameters, there may be a registration deviation between the target image and the reference image, in other words, the target image and the reference image may have inconsistent coordinate systems. To avoid the error caused by such an inconsistency in image matching, as shown in FIG. 5, a medical image processing apparatus 500 according to an embodiment of the present invention includes a matching unit 510, a determination unit 520, a registration unit 530 and a deformation unit 540, wherein the determination unit 520 is similar in configuration to the determination unit described above in combination with the foregoing embodiments.

The registration unit 530 is configured to implement registration on the target image and the reference image. As stated above, the reference images in the reference image set may be a set of the images which are registered and deformed to have a uniform coordinate system. The registration unit 530 may be configured to implement registration on the target image and one or more reference images (e.g. preset representative reference images or reference images selected according to the similarity thereof with the target image for registration) in a reference image set. Specifically, the registration of the target image and the reference image may be implemented using an image registration method known in the art, for example, a method based on mutual information. The registration unit 530 provides the result of the registration, for example, a transfer function, to the deformation unit 540. In other words, the registration unit 530 registers the medical image and each of the plurality of reference images.

The deformation unit 540 is configured to perform a deformation processing on the target image based on the registration result of the registration unit 530. For example, the deformation unit 540 re-samples the target image based on the transfer function determined by the registration unit 530 to obtain an image having a uniform coordinate system with the reference image. In other words, the deformation unit 540 performs deformation on the medical image based on the result of registration by the registration unit 530.

The matching unit 510 may match the region of interest of the target image deformed by the deformation unit 540 with a corresponding sub-region of the reference image based on, for example, a predetermined position template and provide the matching result to the determination 520 to determine a reference image similar to the target image.

Figure 6:
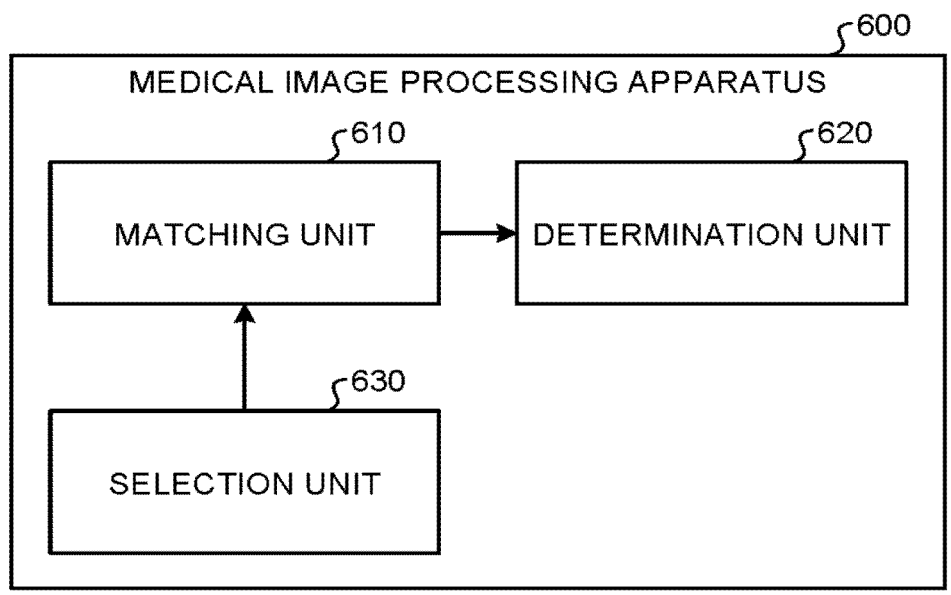
FIG. 6 is a block diagram showing an exemplary configuration of an image processing apparatus according to yet another embodiment of the present invention.
Figure 7:
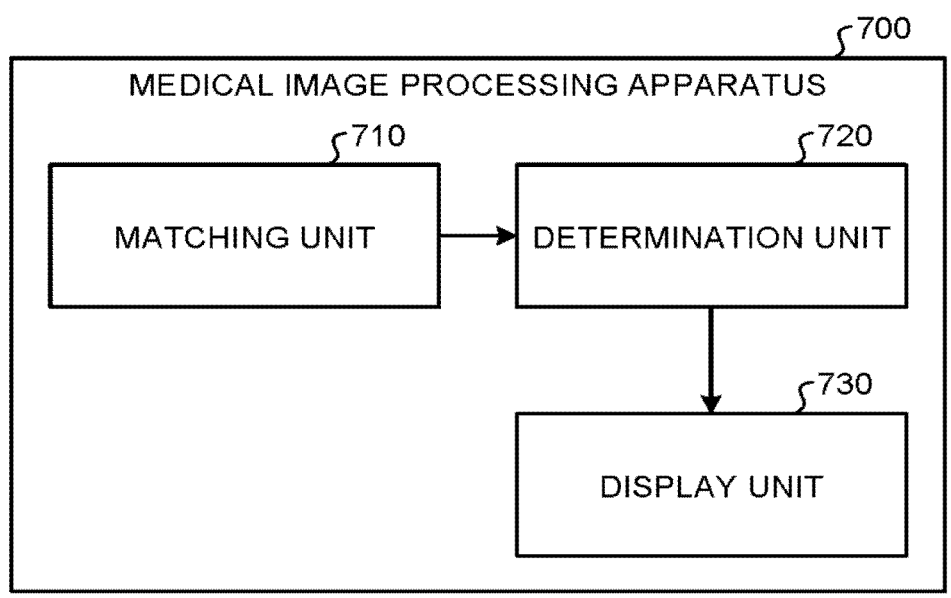
FIG. 7 is a block diagram showing an exemplary configuration of an image processing apparatus according to yet another embodiment of the present invention.

As shown in FIG. 6, a medical image processing apparatus 600 according to an embodiment of the present invention includes a matching unit 610, a determination unit 620 and a selection unit 630. The determination unit 620 is similar in configuration to the determination unit described above in combination with the foregoing embodiments.

The selection unit 630 is configured to select at least one of regions of interest according to a user instruction or a predetermined mode. The matching unit 610 is configured to match the target image with the reference image aiming at the region of interest selected.

For example, in the above exemplary application of differential diagnosis implemented on multiple sclerosis or vascular diseases aiming at multiple white matter injuries, the selection unit 630 selects, for example, the regions 314C and 314D shown in FIG. 3A as regions of interest according to a user instruction. For another example, in the above exemplary application of differential diagnosis on chordoma and chondrosarcoma, the selection unit 630 selects, for example, the region 324 shown in FIG. 3B, as a region of interest according to a user instruction.

Further, in a predetermined mode, for example, in a mode in which a reference image is automatically retrieved based on a target image aiming at a specific disease type, the selection unit 630 may select a corresponding region of interest from a position template according to a preset scheme.

In the embodiments described above, the determination unit determines one or more reference images having a relatively high similarity with the target image from the reference image set according to the matching result of the matching unit. The reference image determined by the determination unit can be presented to the user, for example, a doctor. Thus, in addition to a matching unit 710 and a determination unit 720, a medical image processing apparatus 700 according to an embodiment of the present invention further includes a display unit 730 which is configured to display the reference image determined by the determination unit.

In other embodiments, the image processing apparatus can provide the determined reference image to an external display through, for example, an output unit, so as to present the determined reference image to the user.

Based on the determined reference image, the user can determine the type of the target image. For example, a doctor can implement differential diagnosis on the target image based on the reference image to, for example, determine the disease type reflected in the target image.

Figure 8:
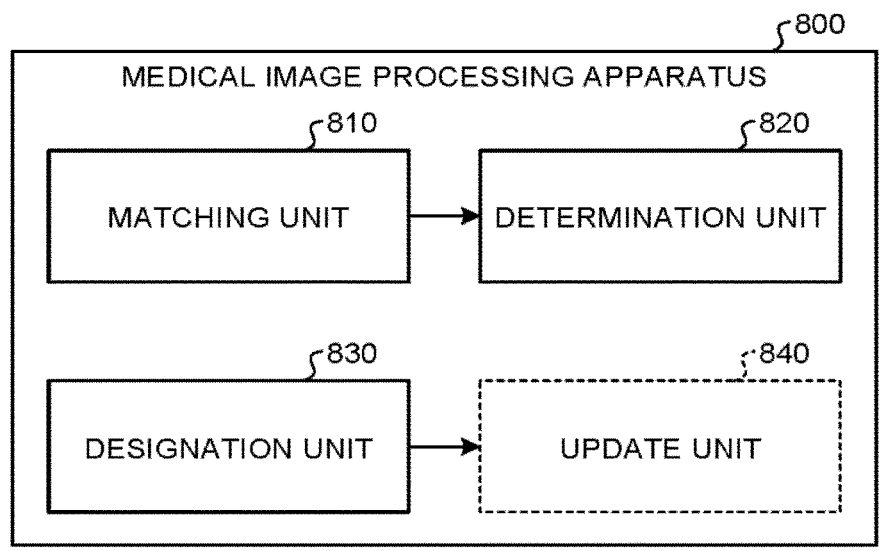
FIG. 8 is a block diagram showing an exemplary configuration of an image processing apparatus according to yet another embodiment of the present invention.

As shown in FIG. 8, in addition to a matching unit 810 and a determination unit 820, a medical image processing apparatus 800 according to an embodiment of the present invention further includes a designation unit 830. The designation unit 830 is configured to designate the type of the target image according to a user input. The type-designated target image may be stored in a corresponding database.

Besides, according to an embodiment of the present invention, the image processing apparatus 800 may further include an update unit 840 is configured to add the type-designated target image in the reference image set as a reference image. In this way, the target image can be used as a reference image for subsequent target images.

Although medical images of brain are exemplarily used as a target image and a reference image in the foregoing embodiments, the present invention is not limited thereto. For example, embodiments of the present invention are also applicable to medical images of thoracic cavity, abdominal cavity and other parts.

Although the foregoing embodiments are given to explain the case in which the sub-region of the reference image is preset, the invention is not limited thereto. For example, the embodiments may include setting of sub-regions on the reference image whenever the matching is performed and matching of the set sub-regions with a region of interest of the target image. A medical image processing apparatus for such a case is described below.

The medical image processing apparatus comprises, for example, a registration unit, a deformation unit, a first setting unit, a second setting unit, and a retrieving unit. The registration unit and the deformation unit are the same as the registration unit 530 and the deformation unit 540, respectively.

The first setting unit sets the first region of interest on the medical image deformed by the deformation unit. For example, the first setting unit sets at least one region of interest on the deformed target image based on the predetermined position template. Such a process is the same as that of the setting unit 230 set forth above.

The second setting unit sets the second region of interest corresponding to the first region of interest on at least two of the plurality of reference images. For example, the second setting unit sets a sub-region corresponding to the region of interest on at least one of the plurality of reference images. Further, the second setting unit sets, for example, a sub-region corresponding to the region of interest included in the position template on at least one of the plurality of reference images. In particular, the target image is deformed by the deformation unit into an image having a uniform coordinate system with the reference image. Thus, the second setting unit sets, for example, a sub-region on a coordinate identical to that of the reference image by reference to the coordinate of the region of interest set on the target image.

The retrieving unit retrieves from a plurality of reference images with the second region of interest set thereon, a reference image similar to the image in the first region of interest. The retrieving unit, for example, retrieves a reference image which has highest similarity with the image in the first region of interest. Further, the retrieving unit retrieves, for example, a reference image based on the similarity between the image characteristics of the first region of interest and the image characteristics of the second region of interest (sub-region).

As such, the medical image processing apparatus can set a sub-region on the reference image and match the set sub-region with the region of interest in the target image.

Although the above embodiments have been given to explain the case of deforming the medical image with the deformation unit, the invention is not limited thereto. For example, the deformation unit may perform deformation on the reference image. In such a case, the registration unit implements registration of the medical image and each of the plurality of reference images in the medical image processing apparatus. The deformation unit performs deformation on at least one of the plurality of reference images based on the result of the registration by the registration unit. The first setting unit sets a first region of interest on the medical image. The second setting unit sets, on a plurality of the deformed reference images, the second region of interest corresponding to the first region of interest. The retrieving unit retrieves from the plurality of reference images having the second region of interest set thereon, a reference image similar to the image in the first region of interest.

In addition, embodiments of the present invention are applicable to various medical images, including magnetic resonance image, computed tomography image, ultrasound image, X-ray image, positron emission tomography image and the like.

Apparently, some processing or methods are also disclosed in the foregoing description on the medical image processing apparatus of the embodiments. These methods are summarized below without repeatedly describing the details which have been discussed above. However, it should be noted that these methods, although disclosed in describing the medical image processing apparatus, are not necessarily employ the foregoing components or not necessarily executed by the foregoing components. For example, embodiments of the image processing apparatus may be partially or wholly implemented with hardware and/or firmware, and the medical image processing method discussed below may also be wholly implemented as a computer-executable program, although these methods can also be implemented as the hardware and/or firmware of the image processing apparatus.

Next, an exemplary process of a medical image processing method according to an embodiment of the present invention is described below with reference to FIG. 9.

Figure 9:
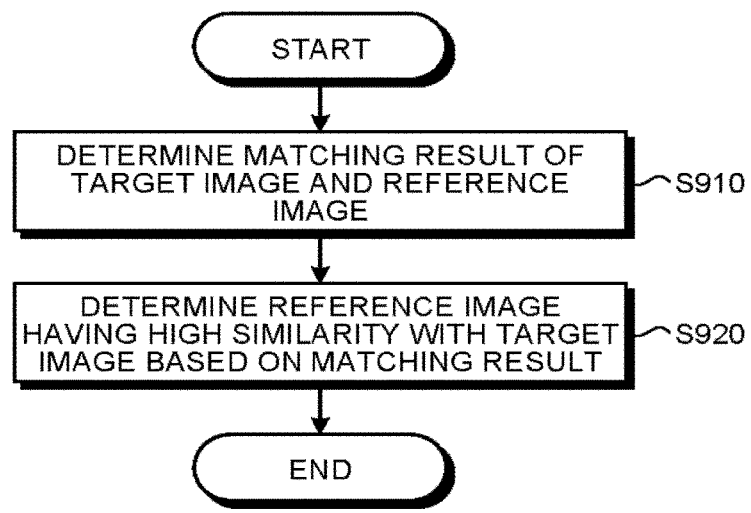
FIG. 9 is a block diagram showing an exemplary process of an image processing method according to an embodiment of the present invention.

As shown in FIG. 9, the medical image processing method according to the embodiment includes a Step S910 of determining the matching result of a target image with at least one reference image in a reference image set, wherein the matching result is determined by matching a region of interest of the target image with a corresponding sub-region of the reference image.

In a Step S920, one or more reference images having relatively high similarity with the target image are determined based on the matching result obtained in Step S910.

Although not shown in the drawings, a medical image processing method according to an embodiment may further include a step of setting at least one region of interest in the target image.

The region of interest may be set according to a predetermined position template.

Further, a medical image processing method according to an embodiment may further include a step of creating a position template according to user input.

Further, a medical image processing method according to an embodiment may further include a step of extracting image characteristics of the region of interest of the target image and a step of storing image characteristics of a corresponding sub-region of a reference image in the reference image set. Accordingly, the target image can be matched with the reference image based on the similarity of the image characteristics.

Further, a medical image processing method according to an embodiment may further include a step of implementing registration on the target image and the reference image and a step of deforming the target image based on the result of the registration.

Further, a medical image processing method according to an embodiment may further include a step of selecting at least one of regions of interest according to a user instruction or a predetermined mode. Moreover, the target image may be matched with the reference image aiming at the region of interest selected.

Further, a medical image processing method according to an embodiment may further include a step of displaying the determined reference image.

Further, a medical image processing method according to an embodiment may further include a step of designating the type of the target image according to user input. Besides, the medical image processing method may further include a step of adding the type-designated target image in the reference image set as a reference image.

Figure 10:
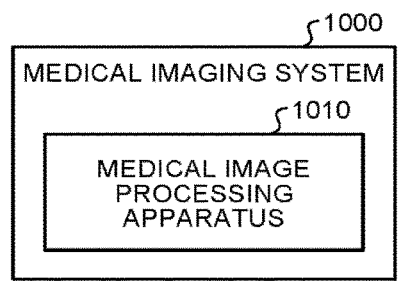
FIG. 10 is a block diagram showing an exemplary configuration of a medical imaging system according to an embodiment of the present invention.

FIG. 10 is a block diagram showing an exemplary configuration of a medical imaging system according to an embodiment of the present invention.

A medical imaging system 1000 according to an embodiment of the present invention includes a medical image processing apparatus 1010. The medical image processing apparatus 1010 may have the same configuration with the medical image processing apparatus described in the foregoing embodiments. For example, the medical imaging system 1000 comprises a registration unit, a deformation unit, a first setting unit, a second setting unit, and a retrieving unit. The registration unit registers the medical image and each of the plurality of reference images. The deformation unit performs deformation on the medical image based on the result of the registration by the registration unit. The first setting unit sets the first region of interest on the deformed medical image. The second setting unit sets the second region of interest corresponding to the first region of interest on at least one of the plurality of reference images. The retrieving unit retrieves from the reference images having the second region of interest set thereon, a reference image similar to the image in the first region of interest. In the medical imaging system 1000, the registration unit, the deformation unit, the first setting unit, the second setting unit, and the retrieving unit may be arranged in a single apparatus or may be distributed into different apparatuses. The medical imaging system 1000 is an example of a medical image processing system.

As an example, each step of the foregoing image processing method and each module and/or unit of the foregoing image processing apparatus may be implemented as software, firmware, hardware or a combination thereof. In a case where the steps or modules and/or units are achieved by software or firmware, a program constituting a software (medical image processing program) for realizing the foregoing method may be installed on a computer having a dedicated hardware structure (e.g. general-purpose computer 1100 shown in FIG. 11) from a storage medium or network, and the computer, when installed with various programs, is capable of realizing the functions.

Figure 11:
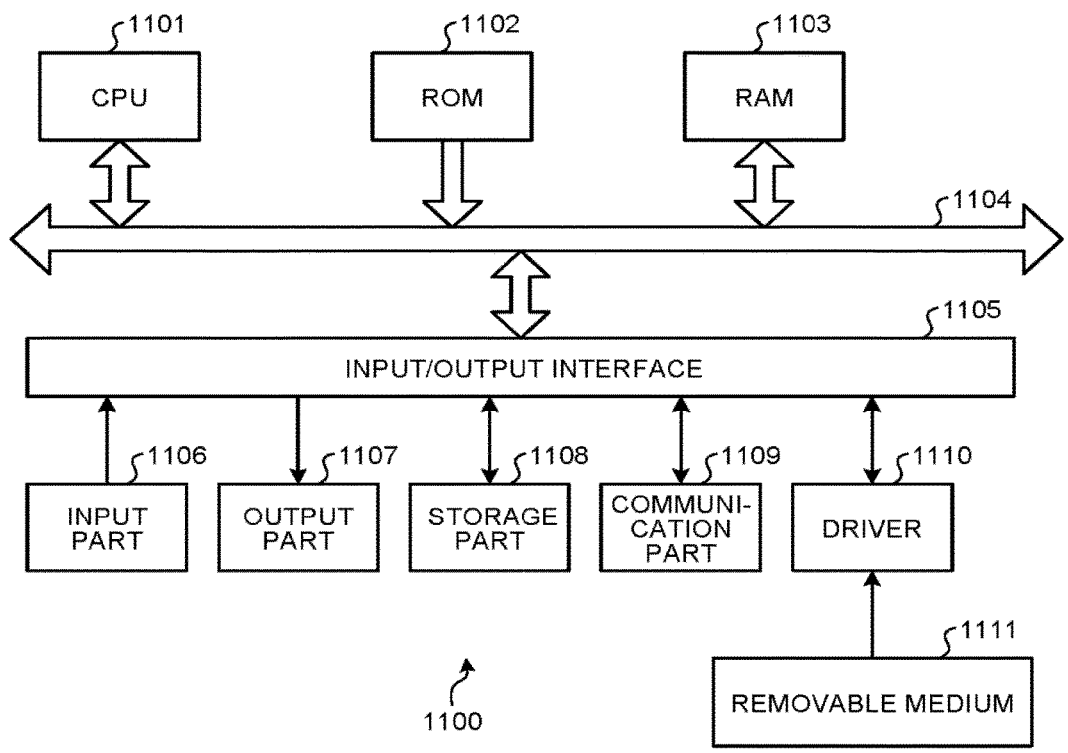
FIG. 11 is a block diagram showing the structure of a computer for realizing the method and device of the invention.

In FIG. 11, a central processing unit (namely, CPU) 1101 executes various processing according to a program stored in a read-only memory (ROM) 1102 or a program loaded to a random access memory (RAM) 1103 from a storage part 1108. The data needed by the CPU 1101 to execute various processing may be stored in the RAM 1103, if needed. The CPU 1101, the ROM 1102 and the RAM 1103 are linked with each other via a bus 1104 with which an input/output interface 1105 is also connected.

The following components are linked with the input/output interface 1105: an input part 1106 (including keyboard, mouse and the like), an output part 1107 (including displays such as cathode ray tube (CRT), liquid crystal display (LCD) and loudspeaker), the storage part 1108 (including hard disk and the like) and a communication part 1109 (including a network interface card such as LAN card and modem). The communication part 1109 executes a communication processing via a network such as the Internet. A driver 1110 may also be linked with the input/output interface 1105, if needed. If needed, a removable medium 1111, for example, a magnetic disc, an optical disc, a magnetic optical disc, a semiconductor memory and the like, may be installed in the driver 1110 to read a computer program therefrom and install the read computer program in the storage part 1108 as required.

In a case where the foregoing series of processing is achieved by software, programs forming the software are installed from a network such as the Internet or a storage medium such as the removable medium 1111.

It should be appreciated by those skilled in the art that the storage medium is not limited to be the removable medium 1111 shown in FIG. 11 in which programs are stored and which are distributed separated from the apparatus to provide the programs for users. The removable medium 1111 may be, for example, a magnetic disc (including floppy disc (registered trademark)), a compact disc (including compact disc read-only memory (CD-ROM) and digital versatile disk (DVD)), a magnetic optical disc (including mini disc (MD) (registered trademark)), and a semiconductor memory. Alternatively, the storage mediums may be the hard discs included in the ROM 1102 and the storage part 1108, and programs are stored in the storage mediums and can be distributed to users along with the storage medium.

The present invention further provides a program product in which machine-readable instruction codes are stored. The foregoing image processing methods according to the foregoing embodiments of the present invention can be executed when the instruction codes are read and executed by a machine.

Accordingly, a storage medium for carrying the program product in which computer-readable instruction codes are stored is also included in the present invention. The storage medium includes, but is not limited to, a soft disc, an optical disc, a magnetic optical disc, a memory card, a memory stick and the like.

In the foregoing description of specific embodiments of the present invention, the features described and/or shown for an implementation mode may be used in one or more other implementation modes in the same or like way or combined with those of the other implementation modes, or replace those of the other implementation modes.

It should be emphasized that the terms 'comprise/include', as used herein, refer to the presence of a feature, an element, a step or a component, but does not preclude the presence or addition of one or more other features, elements, steps or components.

In the above-described embodiments and examples, each step and/or unit are/is represented with a reference sign consisting of figures. It should be understood by those of ordinary skill in the art that the reference signs are merely intended to facilitate description and drawing but are not to be construed as limiting an order or any other aspect.

The units (processing units) as described in the above embodiments may be integrated into one processing circuitry and may be carried out. The units may be divided in a plurality of processing circuitry and may be carried out.

Furthermore, the method of the present invention may be implemented sequentially, synchronously or independently according to another time sequence, but not limited to be implemented according to the time sequence described herein. Therefore, the implementation order of the methods described herein is not to be construed as limiting the technical scope of the present invention.

While the present invention has been disclosed with reference to descriptions for the specific embodiments of the present invention, it should be understood that all of the above mentioned embodiments and examples are illustrative instead of limiting. A variety of modifications, improvements or equivalents can be devised by those skilled in the art without departing from the spirit and scope of the attached claims. The modifications, improvements or equivalents should also be considered as being included in the protection scope of the present invention.

What is claimed is:

1. A medical image processing apparatus, comprising: processing circuitry configured to
   implement registration on a medical image and each of a plurality of reference images;
   perform deformation on the medical image based on a result of the registration;
   set a first region of interest on the deformed medical image;
   set, on at least two of the plurality of reference images, a second region of interest corresponding to the first region of interest; and
   retrieve, from the reference images on which the second region of interest is set, a reference image similar to an image in the first region of interest.

2. The medical image processing apparatus according to claim 1, wherein the processing circuitry is further configured to retrieve a reference image that has highest similarity with the image in the first region of interest.

3. The medical image processing apparatus according to claim 1, wherein the processing circuitry is further configured to
   set a plurality of first regions of interest; and
   set a plurality of second regions of interest corresponding respectively to each of the plurality of set first regions of interest.

4. The medical image processing apparatus according to claim 3, wherein the processing circuitry is further configured to select at least one of the plurality of first regions of interest, wherein the processing circuitry retrieves a reference image which has a highest similarity with each of the images in the first region of interest selected by the processing circuitry.

5. The medical image processing apparatus according to claim 1, wherein the processing circuitry is further configured to display, on a display at a same time, the medical image and a reference image retrieved by the processing circuitry.

6. The medical image processing apparatus according to claim 1 wherein the plurality of reference images are atlas images.

7. The medical image processing apparatus according to claim 1, wherein the processing circuitry is further configured to set at least one of the plurality of first regions of interest based on a position template in which each of the plurality of first regions of interest is arranged in a predetermined positional relationship.

8. The medical image processing apparatus according to claim 7, wherein the processing circuitry is further configured to create the position template based on input from an operator.

9. The medical image processing apparatus according to claim 1, wherein the processing circuitry is further configured to
   extract first image characteristics, which are characteristics of an image included in the first region of interest set on the medical image; and store second image characteristics, which are characteristics of an image included in the second region of interest set on the at least two of the plurality of the reference images; and retrieve the reference image based on a similarity between the first image characteristics and the second image characteristics.

10. The medical image processing apparatus according to claim 1, wherein the processing circuitry is further configured to receive designation of types of the medical images based on input from an operator; and add the medical image of the designated type as the reference image.

11. The medical image processing apparatus according to claim 1, wherein the medical image and the plurality of reference images include an image of a brain.

12. The medical image processing apparatus according to claim 1, wherein the medical image and the plurality of reference images include at least one of magnetic resonance image, a computed tomography image, an ultrasound image, and an X-ray image.

13. A medical image processing apparatus, comprising:
processing circuitry configured to
    implement registration on a medical image and each of a plurality of reference images;
    perform deformation on at least one of the plurality of reference images based on a result of the registration;
    set a first region of interest on the medical image;
    set, on the deformed reference images, a second region of interest corresponding to the first region of interest; and
    retrieve, from the reference images on which the second region of interest is set, a reference image similar to an image in the first region of interest.

14. A medical image processing method, comprising:
implementing registration on a medical image and each of a plurality of reference images;
performing deformation on the medical image based on a result of the registration;
setting a first region of interest on the deformed medical image;
setting, on at least two of the plurality of reference images, a second region of interest corresponding to the first region of interest; and
retrieving, from the reference images on which the second region of interest is set, a reference image similar to an image in the first region of interest.

15. A medical imaging system, comprising:
processing circuitry configured to
    implement registration on a medical image and each of a plurality of reference images;
    perform deformation on the medical image based on a result of the registration;
    set a first region of interest on the deformed medical image;
    set, on at least two of the plurality of reference images, a second region of interest corresponding to the first region of interest; and
    retrieve, from the reference images on which the second region of interest is set, a reference image similar to an image in the first region of interest.

* * * * *